United States Patent
Yoshida et al.

(10) Patent No.: US 8,599,919 B2
(45) Date of Patent: Dec. 3, 2013

(54) MOVING IMAGE CODING/DECODING SYSTEM AND MOVING IMAGE CODING APPARATUS AND MOVING IMAGE DECODING APPARATUS USED THEREIN

(75) Inventors: Toshiyuki Yoshida, Fukui (JP); Tomoko Aono, Osaka (JP); Norio Itoh, Osaka (JP); Toshio Nomura, Osaka (JP); Tomohiro Ikai, Osaka (JP); Takeshi Tsukuba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 611 days.

(21) Appl. No.: 12/865,054

(22) PCT Filed: Jan. 26, 2009

(86) PCT No.: PCT/JP2009/051217
§ 371 (c)(1),
(2), (4) Date: Jul. 28, 2010

(87) PCT Pub. No.: WO2009/096366
PCT Pub. Date: Aug. 6, 2009

(65) Prior Publication Data
US 2011/0002383 A1    Jan. 6, 2011

(30) Foreign Application Priority Data

Jan. 29, 2008 (JP) ................................. 2008-017981

(51) Int. Cl.
*H04N 7/12* (2006.01)
*H04N 11/02* (2006.01)
*H04N 11/04* (2006.01)
*H04B 1/66* (2006.01)

(52) U.S. Cl.
USPC ............................... 375/240.12; 375/240.19

(58) Field of Classification Search
USPC ...................................................... 375/240.12
See application file for complete search history.

(56) References Cited

U.S. PATENT DOCUMENTS 6,798,838 B1 *  9/2004  Ngo .......................... 375/240.19
2007/0053425 A1 *  3/2007  Ridge et al. ................... 375/240

FOREIGN PATENT DOCUMENTS

| JP | 9-182065 A | | 7/1997 |
| JP | 10-012826 | * | 1/1998 |
| JP | 10-13826 A | | 1/1998 |
| JP | 2003-348579 A | | 12/2003 |

* cited by examiner

*Primary Examiner* — Christopher S Kelley
*Assistant Examiner* — Hee-Yong Kim
(74) *Attorney, Agent, or Firm* — Birch, Stewart, Kolasch & Birch, LLP

(57) ABSTRACT

An image quality/rate control portion 106 confirms whether a predictive code amount Ci is a target code amount Rt or less. When the predictive code amount Ci is the target code amount Rt or less, the predictive code amount Ci is output to a base layer coding portion 101. Then, a switch 108 is turned off. When the predictive code amount Ci exceeds the target code amount Rt, the target code amount Rt is output to the base layer coding portion 101. Then, the switch 108 is turned on and (predictive code amount Ci−target code amount Rt) is output to an enhancement layer coding portion 103. A buffer 104 stores coded data of the base layer coding portion 101 and the enhancement layer coding portion 103.
In this manner, while performing fixed bit rate coding using a single transmission path, image quality of a moving image is made constant so as to prevent deterioration of image quality.

4 Claims, 11 Drawing Sheets

FIG.6
(a)
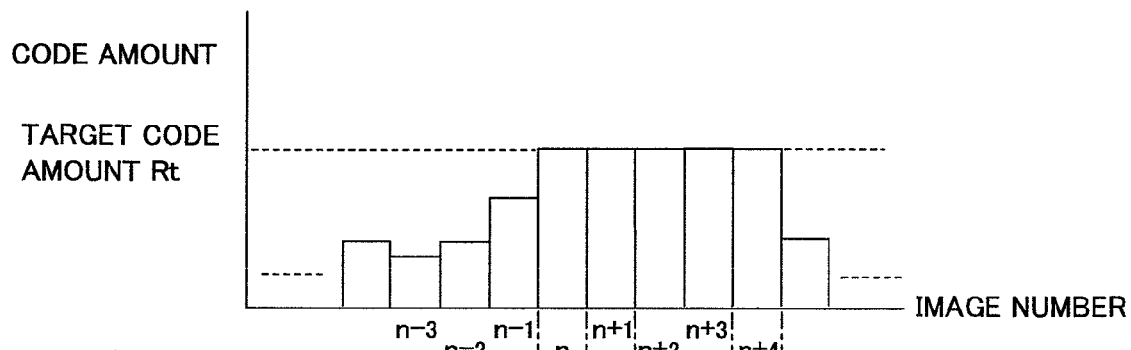
(b)
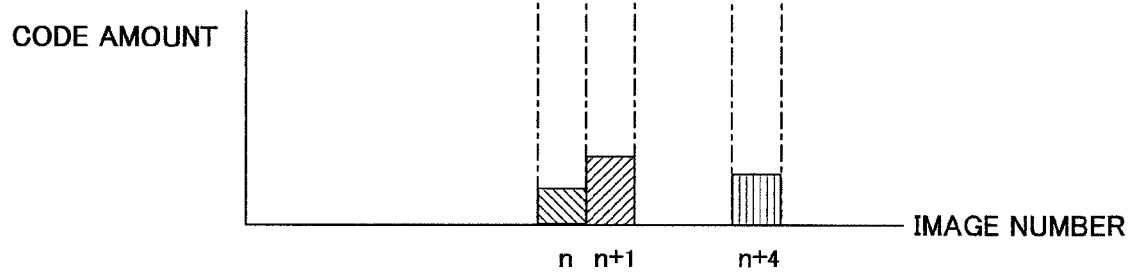
(c)
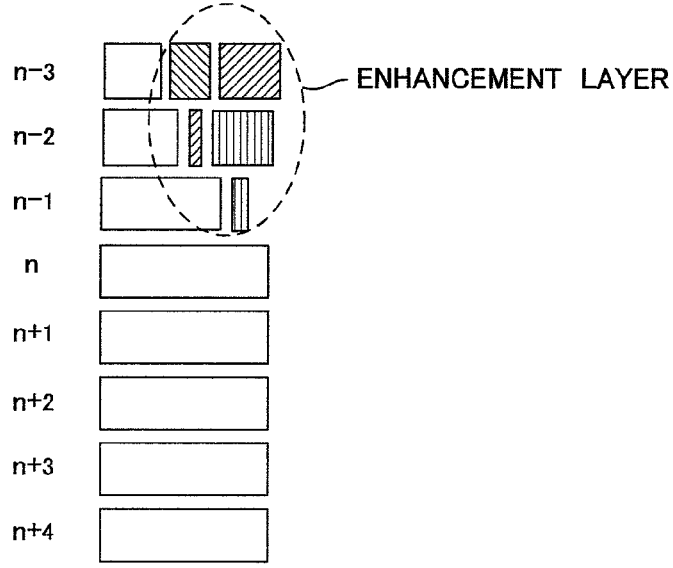

FIG.7
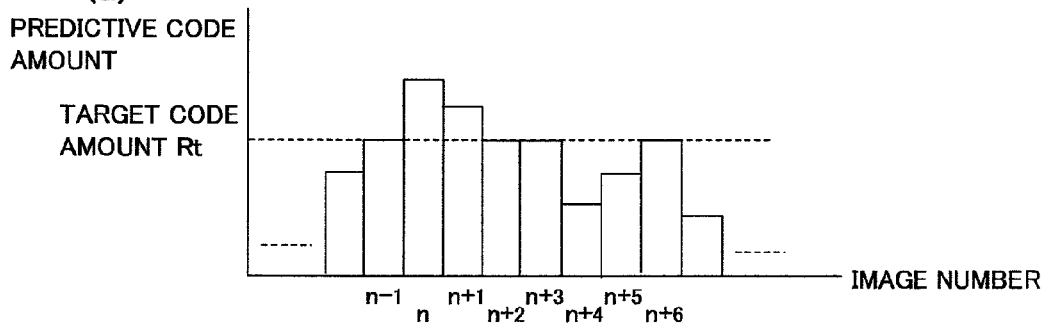
(a)
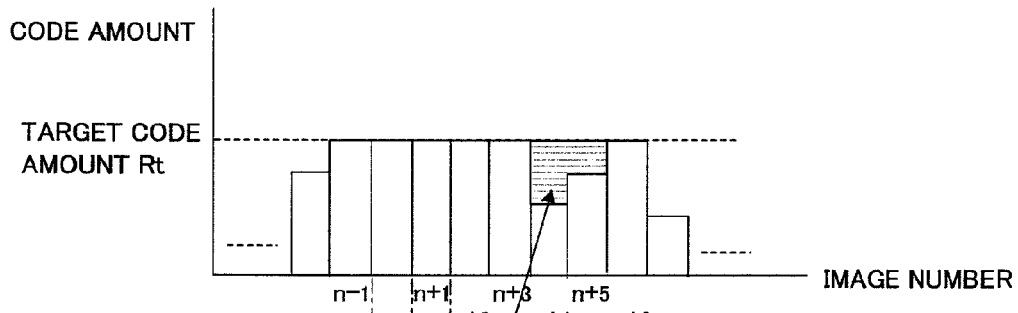
(b)
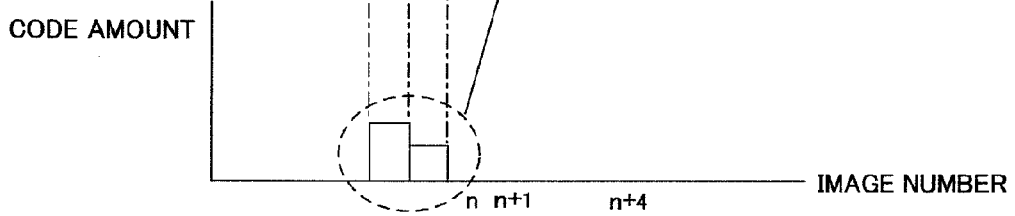
(c)
FIG.8
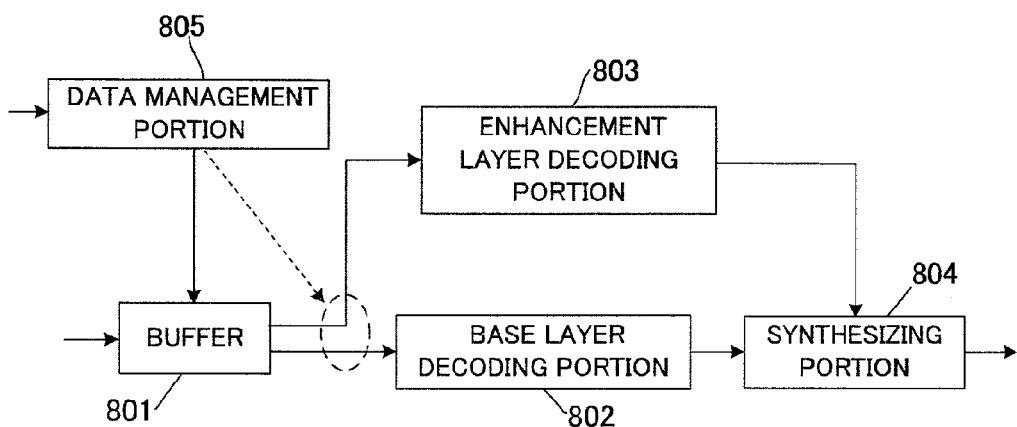

| | DECODING TIME | ADDRESS | | DECODING TIME | TYPE OF HIERARCHY | PRIORITY ORDER | ADDRESS |
|---|---|---|---|---|---|---|---|
| Bn-3 | 05:10:067 | 41AE74 | En | 05:10:267 | SNR | 1 | 41B9F8 |
| Bn-2 | 05:10:133 | 41B001 | En+1 | 05:10:333 | SNR | 2 | 41BA8E |
| Bn-1 | 05:10:200 | 41B188 | En+4 | 05:10:533 | SNR | 1 | 41BB56 |
| Bn | 05:10:267 | 41B30F | | | | | |
| Bn+1 | 05:10:333 | 41B51C | | | | | |
| Bn+2 | 05:10:400 | 41B729 | | | | | |
| | | | | | | | |
| | | | | | | | |
| | | | | | | | |

CODED DATA B: Bn-3, Bn-2, Bn-1, Bn, Bn+1, Bn+2
CODED DATA E: En, En+1, En+4

READ-OUT ADDRESS ↑ (at Bn-3)
WRITE-IN ADDRESS ↑ (after Bn+2)
READ-OUT ADDRESS ↑ (at En)
WRITE-IN ADDRESS ↑ (after En+4)

|  | DECODING TIME | ADDRESS |  | DECODING TIME | TYPE OF HIERARCHY | PRIORITY ORDER | ADDRESS |
|---|---|---|---|---|---|---|---|
| Bn-3 | 05:10:067 | 41AE74 | En+4 | 05:10:533 | SNR | 1 | 41BB56 |
| Bn-2 | 05:10:133 | 41B001 |  |  |  |  |  |
| Bn-1 | 05:10:200 | 41B188 |  |  |  |  |  |
| Bn | 05:10:267 | 41B30F |  |  |  |  |  |
| Bn+1 | 05:10:333 | 41B51C |  |  |  |  |  |
| Bn+2 | 05:10:400 | 41B729 |  |  |  |  |  |
| Bn+3 | 05:10:467 | 41B936 |  |  |  |  |  |
|  |  |  |  |  |  |  |  |
|  |  |  |  |  |  |  |  |

(a)

| | DECODING TIME | ADDRESS | | DECODING TIME | TYPE OF HIERARCHY | PRIORITY ORDER | ADDRESS |
|---|---|---|---|---|---|---|---|
| Bn-3 | 05:10:067 | 41AE74 | En | 05:10:267 | SNR | 1 | 41BAC0 |
| Bn-2 | 05:10:133 | 41B001 | En+4 | 05:10:533 | SNR | 1 | 41BB56 |
| Bn-1 | 05:10:200 | 41B188 | | | | | |
| Bn | 05:10:267 | 41B30F | | | | | |
| Bn+1 | 05:10:333 | 41B51C | | | | | |
| Bn+2 | 05:10:400 | 41B729 | | | | | |
| | | | | | | | |
| | | | | | | | |
| | | | | | | | |

MANAGEMENT INFORMATION

|  | DATA LENGTH | HIERARCHY | PRIORITY ORDER | DECODING TIME | TYPE OF HIERARCHY |  |
|---|---|---|---|---|---|---|
| Bn-3 | 187 | B |  | 05:10:067 |  | CODED DATA OF Bn-3 |
| En | 150 | E | 1 | 05:10:267 | SNR | CODED DATA OF En |
| Bn-2 | 300 | B |  | 05:10:133 |  | CODED DATA OF Bn-2 |
| En+1 | 200 | E | 2 | 05:10:333 | SPATIAL | CODED DATA OF En+1 |
| Bn-1 | 425 | B |  | 05:10:200 |  | CODED DATA OF Bn-1 |
| En+4 | 275 | E | 1 | 05:10:533 | SNR | CODED DATA OF En+4 |
| Bn | 840 | B |  | 05:10:267 |  | CODED DATA OF Bn |
| Bn+1 | 840 | B |  | 05:10:333 |  | CODED DATA OF Bn+1 |
| Bn+2 | 840 | B |  | 05:10:400 |  | CODED DATA OF Bn+2 |
| Bn+3 | 840 | B |  | 05:10:467 |  | CODED DATA OF Bn+3 |
|  |  | B |  |  |  |  |

HIERARCHY B: BASE LAYER
HIERARCHY E: ENHANCEMENT LAYER

FIG.17

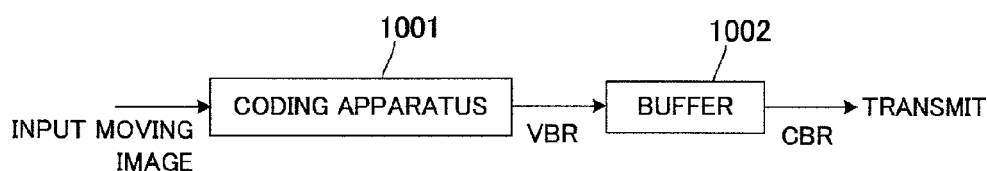

FIG.18
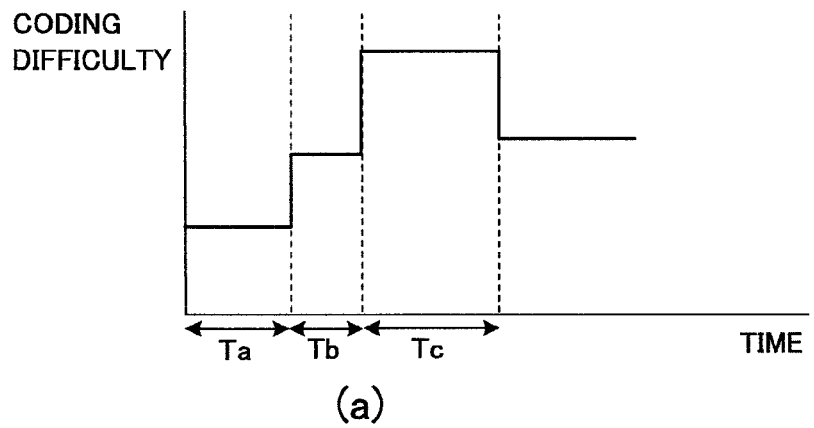
(a)
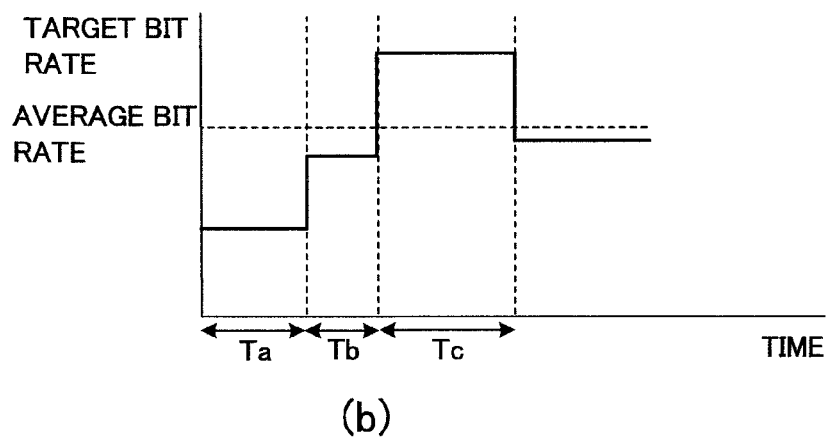
(b)
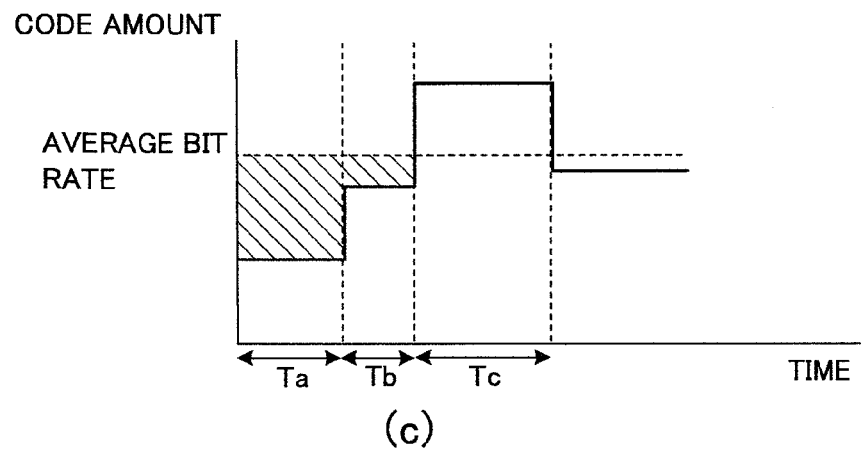
(c)

MOVING IMAGE CODING/DECODING SYSTEM AND MOVING IMAGE CODING APPARATUS AND MOVING IMAGE DECODING APPARATUS USED THEREIN

TECHNICAL FIELD

The present invention relates to a coding apparatus and a decoding apparatus for a moving image, more particularly, to a moving image coding/decoding system, provided with a buffer, for coding and decoding a moving image with a desired bit rate, and a moving image coding apparatus and a moving image decoding apparatus used therein.

BACKGROUND ART

When a moving image is digitized and transmitted via a network represented by the Internet etc., an amount of data thereof is enormous. It is generally performed that the moving image is coded to reduce the amount of data.

At this time, as methods for controlling the amount of coded data, there are fixed bit rate coding and variable bit rate coding. The fixed bit rate coding has such a system that, as shown in FIG. 17, a buffer 1002 is provided between a coding apparatus 1001 and a transmission path and fluctuation of a code amount in a short term is absorbed as well as control is performed so that the amount of generated codes matches a transmission bit rate such as by applying feedback controlling based on the amount of generated codes in the past and remaining capacity of the buffer. Note that, one even including the buffer is sometimes called the coding apparatus.

For example, in Patent Literature 1 described below, when a scene whose coding difficulty is high is coded continuously, a method for setting a target bit rate of a scene whose coding difficulty is low to be small is taken to secure the target bit rate. FIG. 18 shows an example of rate control by coding difficulty, where (a) shows a relation between coding difficulty and time, (b) shows a relation between a target bit rate and time and (c) shows a relation between a code amount and time. Specifically, in FIG. 18, since the coding difficulty of a scene in a term Tc is high, target bit rates for scenes in terms Ta and Tb that are just before the scene and whose coding difficulty is low are set to be small to suppress an amount of generated codes to be small and increase the remaining capacity of a buffer. Then, with the use of the remaining capacity of the buffer, the target bit rate for the scene in the term Tc is set to be high so that probability that deterioration of image quality is generated is reduced in the scene that is difficult to code.

On the other hand, the variable bit rate coding has a system that is usable for transmission in a high-speed packet network, which has been studied in ATM (asynchronous transfer mode) video coding etc. (Non-Patent Literature 1 described below). In ideal variable bit rate coding, only necessary information may be coded and there is an advantage that constant image quality can be kept.

Meanwhile, hierarchical coding is to transmit video signal information by dividing into information of plural hierarchies. Here, a hierarchical coding system as shown in FIG. 19 is examined and coded data is transmitted through a plurality of transmission paths. The hierarchization is carried out on the basis of such as from low quality to high quality, from a low rate to a high rate and from low resolution to high resolution. The hierarchical coding system shown in FIG. 19 is called a feedback type, in which a difference between a video signal and an input video signal transmitted in a low hierarchy is sequentially coded in a higher hierarchy.

That is, coding apparatuses 1100 for coding input video signals in each hierarchy are included and the signals coded by them are transmitted to decoding apparatuses 1300 via a transmission network 1200 in each transmission channel. The decoding apparatus 1300 decodes and reproduces the received signal. Here, the coding apparatus 1100 is comprised of a coder 1101 for coding an input video signal and a local decoder 1102 for decoding a coded signal, in which a difference between the video signal decoded by the local decoder 1102 and the input video signal to a low hierarchy serves as an input video signal to a next hierarchy.

For example, in Patent Literature 2 described below, a case of two hierarchies is described. Here, coded data is separated into a significant portion in terms of image quality (MSP) and an else portion (LSP), and packetizing is carried out using only the MSP or the LSP to transmit to a transmission path together with an identifier indicating whether the MSP or the LSP is included. Then, the MSP is sent in a high-priority transmission class and the LSP is sent in a low-priority transmission class. In the case of network congestion, discarding is performed from the packet including the LSP so as to correspond to packet loss which becomes a problem in ATM transmission.

Patent Literature 1: Japanese Patent Application Laid-open No. 2001-69463
Patent Literature 2: Japanese Patent Application Laid-open No. 1992-111695
Non-Patent Literature 1: Wada Masahiro, 1991 Picture Coding Symposium PCSJ91, pp 239-242

DISCLOSURE OF THE INVENTION

Problems to be Solved by the Invention

Meanwhile, in Patent Literature 1, the buffer is provided between the coding apparatus and the transmission path and fluctuation of the code amount in a short term is absorbed. Accordingly, when a scene that is difficult to code continues for a long term, fluctuation of the code amount can not be absorbed and deterioration of image quality can not be suppressed. The term during which the fluctuation of the code amount can be absorbed depends on a buffer size of a decoding apparatus, which is prescribed by the specification of the communication service. Thus, there is a problem that the code amount can not be fluctuated beyond this size.

Further, in Patent Literature 2, since network resources are limited in an actual network, there poses a problem of causing restrictions. In the case of the variable bit rate coding, prior to communication, a terminal declares parameters of an average bit rate, a maximum bit rate, a packet loss class and the like for the network. In accordance with the declaration, on the network side, network resources are secured and traffics from the terminal are monitored during communication so that data over a declared number does not flow into the network. Thus, it is not to say that the code amount can be generated without limitation even in the variable bit rate coding and it is necessary to perform coding in a certain limit. Therefore, there is a problem that the advantage of the variable bit rate coding is difficult to be used sufficiently.

Accordingly, in order to solve the above described problems, the present invention aims to provide a moving image coding/decoding system preventing deterioration of image quality by making image quality of a moving image constant while performing fixed bit rate coding using a single transmission path, and a moving image coding apparatus and a moving image decoding apparatus used therein.

Means to Solve the Problems

The present invention provides a moving image coding/decoding system comprised of a moving image coding apparatus and a moving image decoding apparatus, that is characterized in that the moving image coding apparatus includes a code amount prediction portion for predicting a code amount needed to realize predetermined image quality to be targeted, a target amount coding portion for coding a moving image with a target code amount set in advance or less, at least one excess coding portion for, when the code amount predicted by the code amount prediction portion exceeds the target code amount, coding information needed to satisfy the target image quality for a part exceeding the target code amount, a coding buffer for storing target amount coded data coded by the target amount coding portion and excess coded data coded by the excess coding portion, and information addition means for adding information for decoding in transmission to the coded data, and combines the excess coded data with the target amount coded data for transmission so that the total of coded data transmitted at each time becomes a constant code amount or less, and the moving image decoding apparatus includes information reading means for reading the added information from the target amount coded data and the excess coded data transmitted from the moving image coding apparatus, a decoding buffer for storing the target amount coded data and the excess coded data transmitted from the moving image coding apparatus, and the added information thus read, a target amount decoding portion for decoding the target amount coded data, at least one excess decoding portion for decoding the excess coded data, and a synthesizing portion for synthesizing decoded images decoded by the target amount decoding portion and the excess decoding portion and outputting the synthesized image, and decodes the target amount coded data and the excess coded data stored in the decoding buffer in accordance with the added information or a determination criteria of the moving image decoding apparatus.

Further, the present invention provides a moving image coding apparatus, including a code amount prediction portion for predicting a code amount needed to realize predetermined image quality to be targeted, a target amount coding portion for coding a moving image with a target code amount set in advance or less, at least one excess coding portion for, when the code amount predicted by the code amount prediction portion exceeds the target code amount, coding information needed to satisfy the target image quality for a part exceeding the target code amount, a coding buffer for storing target amount coded data coded by the target amount coding portion and excess coded data coded by the excess coding portion, and information addition means for adding information for decoding in transmission to the coded data, that is characterized in that the excess coded data is combined with the target amount coded data for transmission so that the total of coded data transmitted at each time becomes a constant code amount or less.

In the moving image coding apparatus, the information addition means may add information indicative of a decoding time to the target amount coded data and the excess coded data transmitted at each time, may add a delay estimation value to the target amount coded data transmitted at each time, or may add discarding information to the excess coded data transmitted at each time.

Further, the present invention provides a moving image decoding apparatus, including information reading means for reading added information for decoding added to target amount coded data that a moving image is coded with a target code amount set in advance or less and excess coded data that when a code amount needed to realize predetermined image quality to be targeted is predicted and the predictive code amount exceeds the target code amount, information needed to satisfy the target image quality scaled in at least one hierarchy or more for a part exceeding the target code amount is coded, a decoding buffer for storing the target amount coded data, the excess coded data and the added information thus read, a target amount decoding portion for decoding the target amount coded data, at least one excess decoding portion for decoding the excess coded data, and a synthesizing portion for synthesizing decoded images decoded by the target amount decoding portion and the excess decoding portion and outputting the synthesized image, that is characterized in that the target amount coded data and the excess coded data stored in the decoding buffer is decoded in accordance with the added information or a determination criteria of the moving image decoding apparatus.

In the moving image decoding apparatus, a management portion for managing information indicative of a decoding time added to the target amount coded data and the excess coded data is included, to make it possible that the target amount decoding portion and the excess decoding portion decode coded data in synchronization with each other.

Further, when capacity of the decoding buffer storing the target amount coded data and the excess coded data is insufficient, the excess coded data stored in the decoding buffer is discarded and a new area for storing the target amount coded data is secured.

Further, a barometer for determining which part of the excess coded data stored in the decoding buffer is to be discarded is a decoding time added to the coded data.

Effect of the Invention

In the present invention, there is an effect that the total code amount is able to be reduced while maintaining constant image quality compared to a conventional system by causing the coding and decoding order and the transmission order to be not the same. In other words, when the code amount is made the same as that of the conventional system, it is possible to improve image quality.

Further, in the present invention, it is possible to enhance image quality of a reproduced image depending on resources of a decoding apparatus. For example, in a decoding apparatus having a buffer with large capacity, it is possible to reproduce an image with less deterioration of image quality than a decoding apparatus not having.

BRIEF DESCRIPTION OF THE DRAWINGS

FIG. 6 is a view describing an amount of generated codes in each hierarchy in FIG. 4 and a method for transmitting coded data of an enhancement layer;

FIG. 7 is a view describing another method for transmitting coded data of an enhancement layer;

FIG. 8 is an example of a block diagram of a decoding apparatus showing a second embodiment of the present invention;

FIG. 16 is a view showing an example for realizing a buffer by a RAM;

FIG. 17 is a block diagram of a conventional fixed bit rate coding apparatus;

FIG. 18 is a view showing an example of conventional rate control by coding difficulty.

Figure 1:
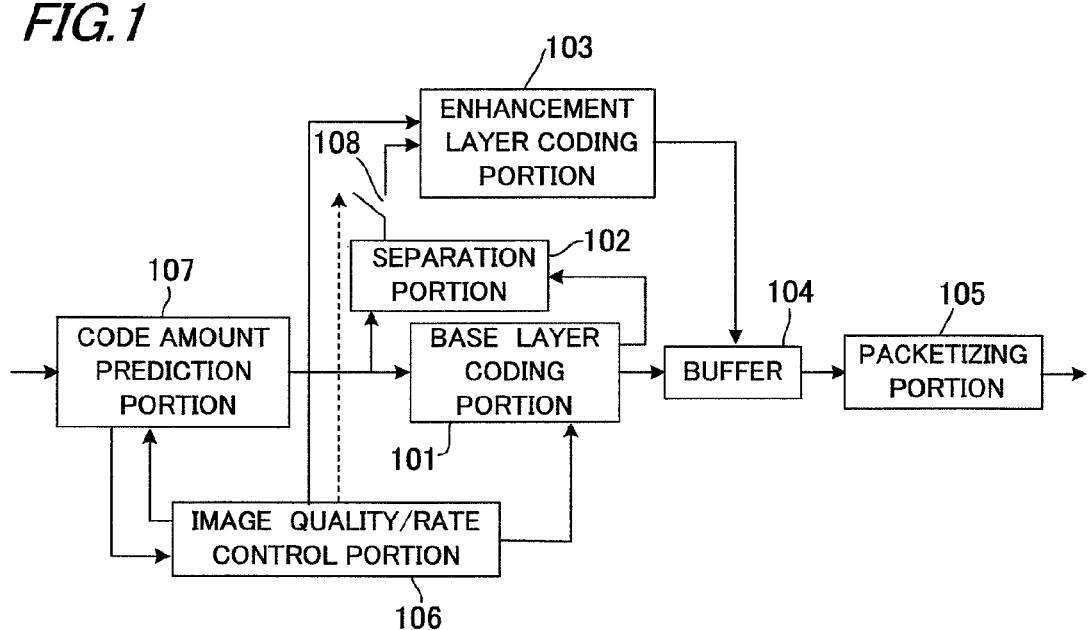
FIG. 1 is an example of a block diagram of a coding apparatus showing a first embodiment of the present invention.

EXPLANATIONS OF NUMERALS 101 base layer coding portion (target amount coding portion)
102 separation portion
103 enhancement layer coding portion (excess coding portion)
104 buffer
105 packetizing portion
106 image quality/rate control portion
107 code amount prediction portion
108 switch
201 orthogonal transformation portion
204 rate control portion
209 motion compensation portion
210 motion detection portion
211 Intra-prediction portion
212 subtraction portion
213 prediction mode determination portion
801 buffer
802 base layer decoding portion (target amount decoding portion)
803 enhancement layer decoding portion (excess decoding portion)
805 data management portion
901 variable length decoding portion
902 inverse quantization portion
903 inverse orthogonal transformation portion
904 addition portion
905 frame memory
906 motion compensation portion
907 intra-prediction portion
1001 coding apparatus
1002 buffer
1100 coding apparatus
1101 coder
1102 local decoder
1200 transmission network
1300 decoding apparatus

BEST MODE FOR CARRYING OUT THE INVENTION

The embodiments of the present invention will hereinafter be described with reference to the accompanying drawings.

The present invention is to transmit with a constant bit rate while coding by dividing into a plurality of hierarchies therein. Although a bit rate in each hierarchy is a variable bit rate, there is a characteristic that the total of bit rates of all hierarchies is controlled to be constant.

First Embodiment

FIG. 1 a block diagram of a coding apparatus showing a first embodiment of the present invention. Here, description will be given for the case of two hierarchies (one base layer and one enhancement layer). 101 denotes a base layer coding portion (target amount coding portion) for coding an input image as the base layer, 102 denotes a separation portion for separating an image to be coded as the enhancement layer from an input image, 103 denotes an enhancement layer coding portion (excess coding portion) for coding the enhancement layer, 104 denotes a buffer for storing coded data of the base layer coding portion 101 and the enhancement layer coding portion 103, 105 denotes a packetizing portion for packetizing coded data stored in the buffer 104 for transmission to a transmission path, 106 denotes an image quality/rate control portion for controlling a code amount allocating to the base layer and the enhancement layer based on image quality or a bit rate, 107 denotes a code amount prediction portion for predicting a code amount of each image as preprocessing of coding, and 108 denotes a switch for switching on/off of the enhancement layer coding portion 103.

The base layer coding portion 101 and the enhancement layer coding portion 103 has a moving image coding system including MPEG-1, MPEG-2, MPEG-4, MPEG-4 AVC, VC1 and the like which are generally used, and the system thereof is not limited. An example of the base layer coding portion 101 and the enhancement layer coding portion 103 are shown in FIG. 2.

Figure 2:
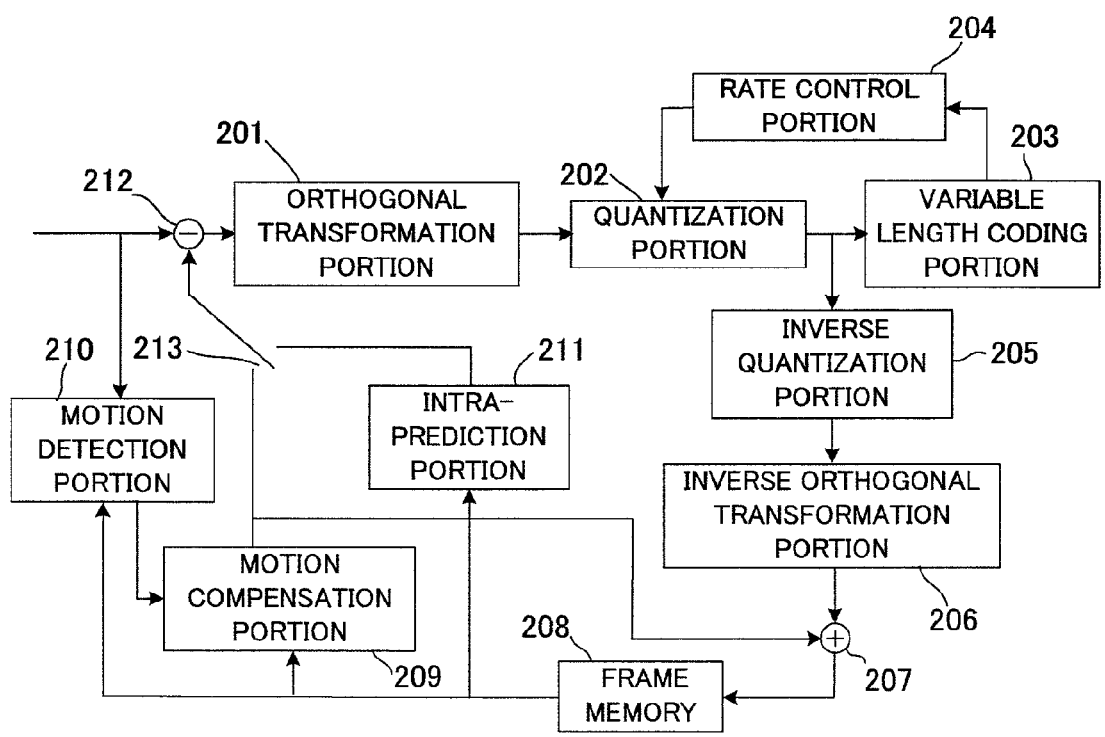
FIG. 2 is an example of a block diagram of coding realizing motion compensation+transform coding.

FIG. 2 is a block diagram of a coding portion realizing general motion compensation+transform coding, and 201 denotes an orthogonal transformation portion, 202 denotes a quantization portion for quantizing a transform coefficient, 203 denotes a variable length coding portion for coding a quantized transform coefficient, a motion vector and a prediction mode which are not shown, etc., 204 denotes a rate control portion for monitoring an amount of generated codes and controlling a quantization parameter or the like to adjust to a target code amount, 205 denotes an inverse quantization portion for inverse quantizing a quantized transform coefficient, 206 denotes an inverse orthogonal transformation portion for inverse orthogonal transforming an inverse quantized transform coefficient, 207 denotes an addition portion for adding a prediction image and prediction errors which are inverse transformed, 208 denotes a frame memory for storing a locally decoded image, 209 denotes a motion compensation portion for performing motion compensation from a motion vector and a past locally decoded image to create a prediction image, 210 denotes a motion detection portion for searching a motion vector, 211 denotes an intra-prediction portion for performing intra-prediction from a locally decoded pixel value in the same image to create a prediction image, 212 denotes a subtraction portion for calculating a difference image between an input image and a prediction image, and 213 denotes a prediction mode determination portion for determining a prediction mode.

Without limitation to FIG. 2, for example, there are an example where there is no intra-prediction portion 211 and an example where there are no motion detection portion 210 and an input image is directly input into the orthogonal transformation portion 201, motion compensation portion 209 and the like.

Note that, in the case of the base layer coding portion 101, an input image is an original image or an original image subjected to preprocessing such as filtering, while in the case of the enhancement layer coding portion 103, an input image is an image separated by the separation portion 102 and to be coded as the enhancement layer from an original image or an image that the separated image is subjected to processing such as filtering.

In addition, the configuration of the base layer coding portion 101, the separation portion 102 and the enhancement layer coding portion 103 may be the same as the configuration of conventional hierarchical coding. For example, it is also possible to replace with MPEG-2 temporal scalability, MPEG-4 spatial scalability, MPEG-4 temporal scalability, MPEG-4 FGS (Fine Granularity Scalability), MPEG-4 SVC (Scalable Video Coding) and the like instead of the above described three components.

However, in each case, there is one which corresponds to the rate control portion 204 of FIG. 2 and, conventionally, control is performed to adjust an amount of generated codes to a predetermined target code amount so that each amount of generated codes of the base layer and the enhancement layer is adjusted to the predetermined target code amount.

However, there is no fixed target code amount in the present invention and the difference from the conventional one is that target values for the base layer and for the enhancement layer calculated by the image quality/rate control portion 106 of FIG. 1 are notified and the amount of generated codes is controlled in accordance with the target code amount which changes dynamically. The operation of the image quality/rate control portion 106 of FIG. 1 will be described below.

Figure 3:
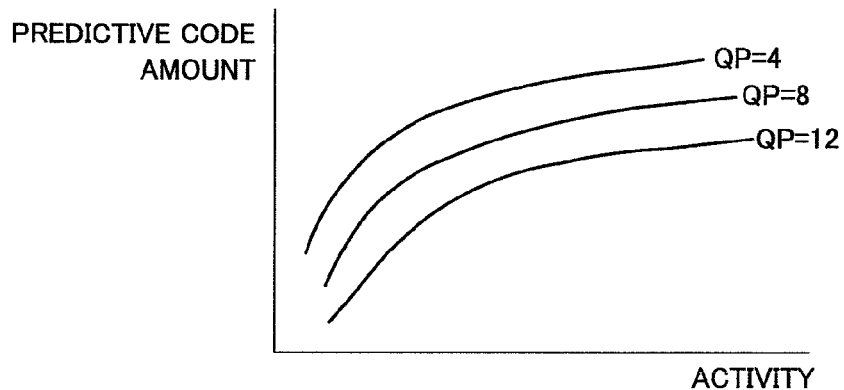
FIG. 3 is a view showing a relation between activity and a predictive code amount in each quantization parameter.

The code amount prediction portion 107 calculates activity of each image to be input and, based on which, predicts the amount of generated codes. For example, as shown in FIG. 3, a relation between activity and a predictive value of the amount of generated codes when the quantization parameter is made constant is obtained for each quantization parameter (QP) by an experiment etc. and held in advance. The code amount predicted based on the activity obtained here and the quantization parameter notified from the image quality/rate control portion 106 is output to the image quality/rate control portion 106.

In the image quality/rate control portion 106, the quantization parameter needed to realize constant image quality is notified to the code amount prediction portion 107 and, based on which, when the predictive code amount notified from the code amount prediction portion 107 is a target code amount Rt or less, the predictive code amount is informed to the base layer coding portion 101 as a target code amount Rb of the base layer, followed by turning off the switch 108 not to operate the enhancement layer coding portion 103. Here, the target code amount Rt corresponds to a fixed transmission bit rate and does not change.

Alternatively, when the predictive code amount in the code amount prediction portion 107 is larger than the target code amount Rt, the target code amount Rt is informed to the base layer coding portion 101 as the target code amount Rb of the base layer, and (predictive code amount−target code amount Rt) is notified to the enhancement layer coding portion 103 as a target code amount Re of the enhancement layer, and the switch 108 is turned on so as to operate the enhancement layer coding portion 103.

In the base layer coding portion 101 and the enhancement layer coding portion 103, each code amount is controlled in accordance with the target code amounts Rb and Re notified from the image quality/rate control portion 106.

Figure 4:
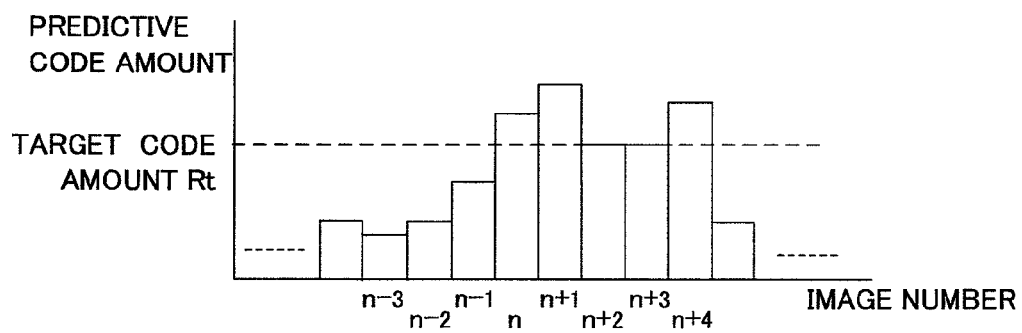
FIG. 4 is a view showing an example of a predictive code amount of each image.

The condition thereof will be described using FIG. 4 and FIG. 5. In images n−3, n−2, n−1, n+2 and n+3 of FIG. 4, the code amount predicted by the code amount prediction portion 107 is the target code amount Rt or less, while in images n, n+1 and n+4, the predictive code amount exceeds the target code amount Rt.

Figure 5:
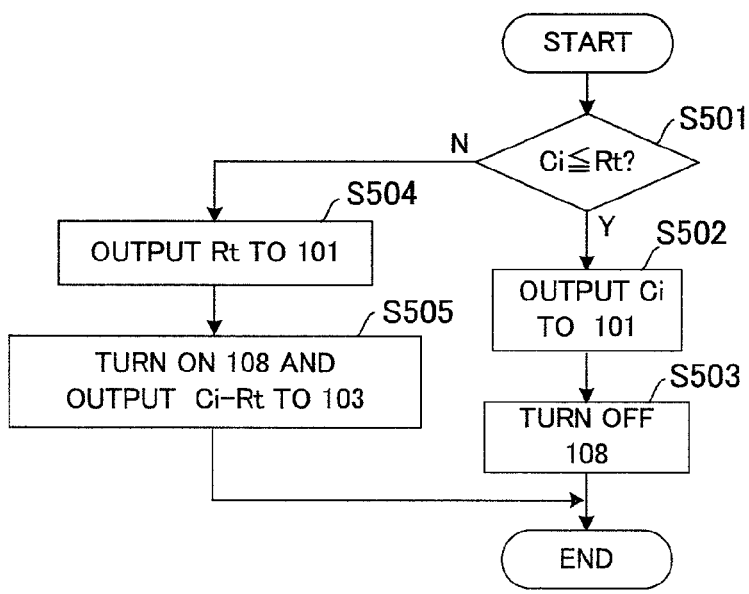
FIG. 5 is a flowchart showing an example of an operation of an image quality/rate control portion.

At this time, with a predictive code amount of an image i (n−3≤i≤n+4) as Ci, the operation of the image quality/rate control portion 106 is shown in FIG. 5 as a flowchart.

The image quality/rate control portion 106 confirms whether the predictive code amount Ci is the target code amount Rt or less (step S501). When the predictive code amount Ci is the target code amount Rt or less (step S501; Y), the predictive code amount Ci is output to the base layer coding portion 101 (step S502). Then, the switch 108 is turned off (step S503). When the predictive code amount Ci exceeds the target code amount Rt (step S501; N), the target code amount Rt is output to the base layer coding portion 101 (step S504). Then, the switch 108 is turned on and (predictive code amount Ci−target code amount Rt) is output to the enhancement layer coding portion 103 (step S505).

Accordingly, an image is always coded with the tar+get code amount Rt or less in the base layer, and when image quality of the base layer is insufficient, the difference image in the enhancement layer is coded, and therefore, by decoding and adding each of coded data of the base layer and coded data of the enhancement layer, it is possible to obtain an image with constant image quality. Hereinafter, coded data of the base layer is referred to as coded data B and coded data of the enhancement layer is referred to as coded data E.

Note that, the relation between activity, a quantization parameter and an amount of generated codes has been used in the above described example, the activity is also replaceable with variance or the sum of absolute differences and the quantization parameter is replaceable with PSNR, MOS (Mean Opinion Score) or the like.

The coded data coded by the base layer coding portion 101 and the enhancement layer coding portion 103 is stored in the buffer 104. In images n−3, n−2, n−1, n+2 and n+3, coded data B with the target code amount Rt or less is output to the buffer 104, while in images n, n+1 and n+4, coded data B substantially with the target code amount and coded data E is output to the buffer 104. The condition thereof is shown in FIGS. 6(a) and (b). FIG. 6(a) shows the code amount of coded data of the base layer and FIG. 6(b) shows the code amount of coded data of the enhancement layer. When the code amount of the enhancement layer is added, the target code amount Rt is exceeded in images n, n+1 and n+4, and accordingly the coded data E is transmitted to the transmission path with the coded data B of images n−3, n−2 and n−1 with less than the target code amount.

First, these coded data is output to the packetizing portion 105 to be packetized therein, and then transmitted to the transmission path. The condition of allocation of the amount of transmitted codes is shown in FIG. 6(c). In packetizing, a hierarchy identifier indicative of the base layer or the enhancement layer and a decoding time are added to the head of coded data of the base layer and the enhancement layer of each image, and further, a type of hierarchical coding such as spatial scalability, temporal scalability, image quality scalability or ROI (Region Of Interest) is added to the enhancement layer and information such as a delay estimation value is added to the base layer. In addition, a hierarchy identifier is also added to a packet header.

From these pieces of information, it is possible to know a hierarchy of coded data, a decoding time, a type of hierarchy and the like on the receiving side. The transmission order of coded data is not always the same as the decoding order as shown in FIG. 6(c). For example, since the coded data E of images n, n+1 and n+4 is transmitted at the same time with the coded data B of images n−3, n−2 and n−1 that are decoded therebefore, normal decoding processing can not be performed on the receiving side without decoding time.

Further, since the hierarchical coding method of the enhancement layer is not subject to limitations in the present invention, it is possible to use various hierarchical coding methods including spatial, temporal, SNR and ROI scalabilities. Accordingly, by adding the type of hierarchical coding to be used, it is possible to transmit to the receiving side.

As above, by allocating coded data E of an image with high coding difficulty to a part where coding difficulty is low and the code amount of the base layer does not reach the target code amount, and transmitting the coded data E to the transmission path, it is possible to carry out coding without deteriorating image quality with the fixed bit rate. At this time, since the coding (decoding) order and the transmission order are different, a delay is caused. When the delay is large, a degree of freedom for combining the small and large code amounts appropriately and making the code amount constant in transmission widens, and therefore, there is an advantage that a possibility of deterioration of image quality is further reduced. When the delay is small, a difference of image quality from the conventional manner is reduced.

In transcoding with a coding method, an image size and a bit rate changed, the coding difficulty of the entire image is known so that it becomes easier to perform control for coding with a constant bit rate with image quality kept constant. Moreover, since the code amount of the only base layer is always the target code amount or less, the buffer on the receiving side is able to store all coded data B, and by decoding only coded data B, it is possible to substantially realize image quality in the conventional system.

In addition, by adding a delay estimation value of coded data to the base layer, it is possible to know in advance on the receiving side that how long delay is caused. Here, the delay estimation value may be a maximum value or an average value of the delay, but needs to have the same meaning on the transmitting side and the receiving side.

Further, since it is possible in the coding apparatus to record a history of the code amount that has been coded so far, when importance of coded data E that is currently stored in the buffer 104 is higher than that of coded data E that has been transmitted so far, by adding a notification for discarding the coded data E that has been transmitted so far to the head of the coded data, it is possible to notify discarding of the coded data E that has been transmitted so far to the decoding apparatus. For example, after coding of an image m (m>n+4) is ended, when it is desired to discard coded data E of an image n that has been already transmitted, a number n of the image which is desirably discarded is transmitted with the coded data of the image m. With discarding of the coded data E of the image n, it is possible to increase remaining capacity of the buffer on the receiving side and to store the coded data E of the image m that is determined by the coding apparatus to be important in the buffer on the receiving side on a priority basis. Further, it is also possible to notify so as to discard not only a specific image but all coded data E that has been transmitted so far.

Moreover, the above described example is that coded data is stored in the buffer 104 for a predetermined time and coded data E is transmitted with coded data B that has been coded in the past chronologically, which is so-called previous transmission of the coded data E, however, as shown in FIG. 7 (where (a) is a predictive code amount of coded data, (b) is a code amount of coded data of the base layer and (c) is a code amount of coded data of the enhancement layer), the present invention is also able to be realized by transmitting coded data E of images n and n+1 with coded data B of images n+4 and n+5, which is so-called following transmission of the coded data E.

Moreover, the above described example is an example in two hierarchies of one base layer and one enhancement layer, but it is also possible to provide a plurality of hierarchies of enhancement layers. In this case, the type of the enhancement layer is increased and the type of hierarchy added to the head of coded data is also increased, thus making it also possible to combine different types of hierarchical coding for each hierarchy. In addition, it is also possible to set the priority order to the enhancement layers and add information showing the priority order to the head of coded data. Note that, it is not that the enhancement layer always exists, and when it is possible to secure sufficient image quality only with the base layer, the enhancement layer may not exist.

As above, in the present invention, while a bit rate for each hierarchy of the base layer and the enhancement layer fluctuates chronologically, the total bit rate combining all hierarchies is always constant, and therefore, new processing (monitoring of traffics and declaration of coding parameters etc.) is not necessary on the transmission network side. That is, by changing only in the coding apparatus and the decoding apparatus, it is possible to reduce possibility of deterioration of image quality.

Second Embodiment

Hereinafter, as a second embodiment of the present invention, description will be given for an example where coded data coded in the first embodiment of the present invention is decoded. FIG. 8 is a block diagram of a decoding apparatus realizing the second embodiment of the present invention. Similarly to the first embodiment, description will be given for the case of two hierarchies (one base layer and one enhancement layer).

801 denotes a buffer for temporarily storing coded data, 802 denotes a base layer decoding portion (target amount decoding portion) for decoding coded data of the base layer, 803 denotes an enhancement layer decoding portion (excess decoding portion) for decoding coded data of the enhancement layer, 804 denotes a synthesizing portion for, when a decoded image of the enhancement layer exists, synthesizing decoded images of the base layer and the enhancement layer, and 805 denotes a data management portion for performing management such as reading added information at the head of received coded data and, in accordance with the information, storing the coded data in the buffer 801 or outputting to the base layer decoding portion 802 or the enhancement layer decoding portion 803. Hereinafter, coded data of the base layer is referred to as coded data B and coded data of the enhancement layer is referred to as coded data E.

The base layer decoding portion 802 and the enhancement layer decoding portion 803 have a moving image coding method including MPEG-1, MPEG-2, MPEG-4, MPEG-4 AVC, VC1 and the like which are generally used and the method thereof is not limited, and perform decoding processing corresponding to the base layer coding portion 101 and the enhancement layer coding portion 103 of FIG. 1.

Figures 9, 10:
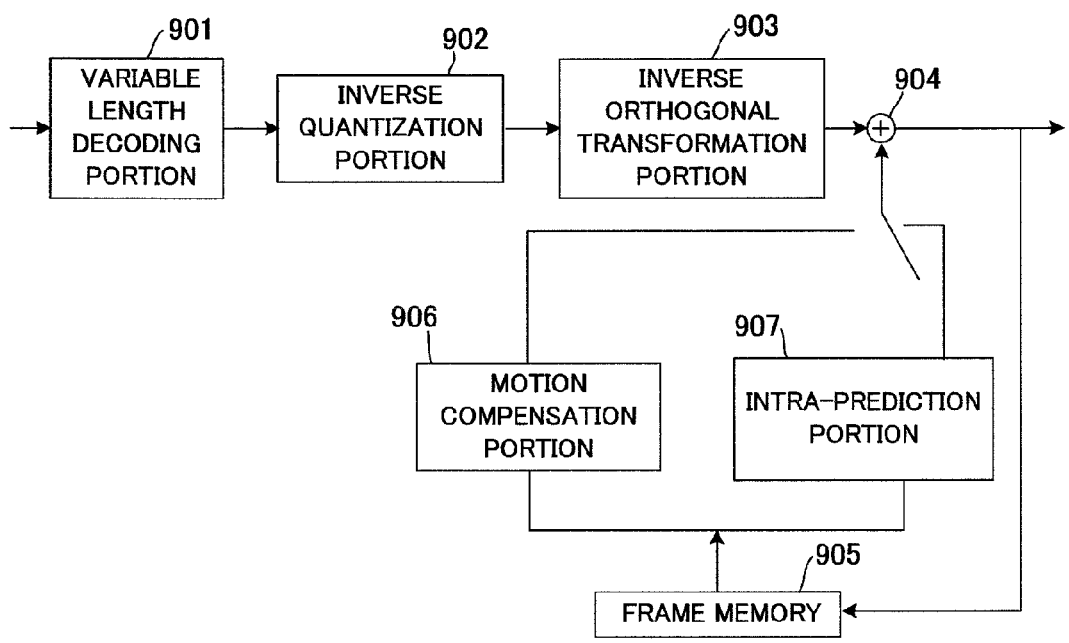
FIG. 9 is an example of a block diagram of decoding realizing motion compensation+transform coding.
FIG. 10 is an example of a management table provided in a data management portion.

An example of the base layer decoding portion 802 and the enhancement layer decoding portion 803 is shown in FIG. 9. 901 denotes a variable length decoding portion for length-variably decoding coded data received, 902 denotes an inverse quantization portion for inverse quantizing a length-variably decoded coefficient, 903 denotes an inverse orthogonal transformation portion for inverse orthogonal transforming an inverse quantized coefficient, 904 denotes an addition portion for adding a prediction image and a prediction error as an output of 903, 905 denotes a frame memory for storing a decoded image, 906 denotes a motion compensation portion for calculating a prediction image using a decoded image stored in the frame memory, a not-shown motion vector and a prediction type decoded by the variable length decoding portion, and 907 denotes an intra-prediction portion for performing intra-prediction from a decoded pixel value in the same image stored in the frame memory. In the case of the base layer decoding portion 802, input of the variable length decoding portion 901 serves as coded data B, while in the case of the enhancement layer decoding portion 803, input of the variable length decoding portion 901 serves as coded data E.

Here, description will be given for the operation of the buffer 801 and the data management portion 805. 805 reads out, from the received packet, coded data and a hierarchy identifier, a decoding time, a type of hierarchical coding, a delay estimation value, discarding information of coded data E and the like added to the head thereof. The data management portion 805 has a management table shown in FIG. 10 as an example and manages the above described added information and stored addresses of coded data in the buffer 801 with the management table.

Further, by the hierarchy identifier, whether coded data is of the base layer or the enhancement layer is determined to write in an area storing the base layer or the enhancement layer in the buffer 801. At this time, an address on the buffer 801 in which coded data of the base layer or the enhancement layer is written next time, and an address on the buffer 801 from which coded data to be output to the base layer decoding portion 802 or the enhancement layer decoding portion 803 is read out are also managed. The address may be an absolute address on the buffer 801 or a relative address from a top address storing coded data.

With the management table and not-shown time information, when a decoding time is reached, the data management portion 805 outputs corresponding coded data of the base layer or the enhancement layer to the base layer decoding portion 802 or to the enhancement layer decoding portion 803 and deletes a record of the corresponding coded data from the management table of FIG. 10.

Next, management of the buffer 801 will be described.

When only coded data B is stored in the buffer 801, since all of each image are coded with the target code amount or less, the capacity will not be insufficient as far as the buffer satisfies the standard or the specification of an application. However, as has been described in the first embodiment of the present invention, extra coded data E is accumulated in the buffer 801 for previous transmission and following transmission of coded data E, and there may be a case where the capacity for newly writing received coded data B is insufficient depending on the code amount of the enhancement layer. In such a case, by discarding coded data E that has been already stored in the buffer but remains without being decoded, a memory needed to save the coded data B is secured. Alternatively, when the enhancement layer has two hierarchies or more and the priority order of each layer is different, by discarding coded data of the enhancement layer, whose priority order is low, that has been already stored in the buffer but remains without being decoded, it is also possible to secure a memory needed to write coded data of the enhancement layer whose priority order is high.

Figures 11, 12:
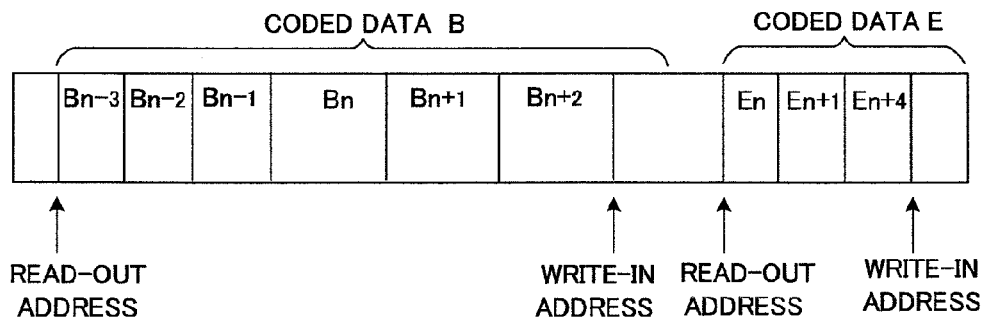
FIG. 11 is a view showing an example of a buffer in the second embodiment of the present invention.
FIG. 12 is an example of a management table provided in the data management portion.

In the buffer 801 shown in FIG. 11, when a write-in address of coded data B exceeds a read-out position of coded data E, it is necessary to secure a memory for storing the coded data B. In this case, to record Bn+3, by deleting records of data from the management table shown in FIG. 10 in the order from En, En+1 . . . with older decoding time sequentially, the coded data E is discarded. The management table in discarding is shown in FIG. 12. En and En+1 are deleted and Bn+3 is newly recorded.

At this time, when a size of the buffer 801 is larger than the standard or the specification of an application, there may be a case where it is not necessary to delete the coded data E. When it is required to have a larger buffer in another application and a decoding apparatus has in advance a larger buffer than prescribed in the standard etc., the coded data E can be used for decoding without deletion, and therefore, it is possible to reproduce an image whose image quality is less deteriorated than an image provided by a decoding apparatus having a minimum buffer prescribed by the standard.

For example, due to the 3GPP definitions, it is essential for mobile phones to have a decoding apparatus compliant to MPEG-4 SP@Level0, however, there are many terminals provided with a buffer compliant to MPEG-4 SP@Level3 for self-playback/self-recording as the proprietary specification of each terminal. In this case, while the buffer size compliant to MPEG-4 SP@Level0 is 20480 bytes, the buffer size compliant to MPEG-4 SP@Level3 is 81920 bytes. In the application compliant to MPEG-4 SP@Level0, coded data which can be decoded with the buffer size of 20480 bytes or less is decoded, but in the case where a decoding apparatus is compliant to MPEG-4 SP@Level3, the buffer size usable is 81920 bytes. That is, the code amount of the enhancement layer which can be decoded varies depending on the buffer capacity of the decoding apparatus.

Figure 13:
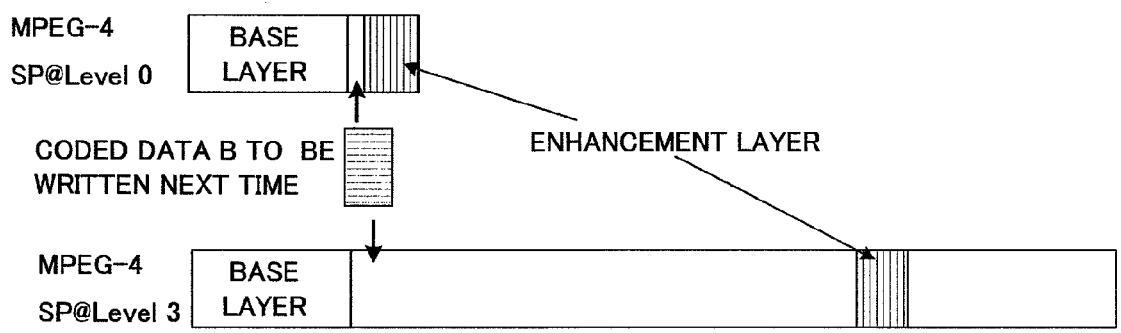
FIG. 13 is a view describing buffer capacity and discarding of coded data of an enhancement layer.

As shown in FIG. 13, since the decoding apparatus compliant to MPEG-4 SP@Level0 stores coded data B in the buffer, it is necessary to discard a part of or all of decoded data E remaining in the buffer, however, the decoding apparatus compliant to MPEG-4 SP@Level3 does not require to discard coded data E remaining in the buffer, thus making it possible to reduce less deterioration of image quality than the decoding apparatus compliant to MPEG-4 SP@Level0.

Note that, since the decoding apparatus compliant to MPEG-4 SP@Level0 is also able to decode all coded data B, image quality equivalent to that of the conventional system is ensured. Accordingly, when the buffer size of a decoding apparatus is large, it is possible to decode an image with much less deterioration of image quality.

Modified Example 1

Figure 14:
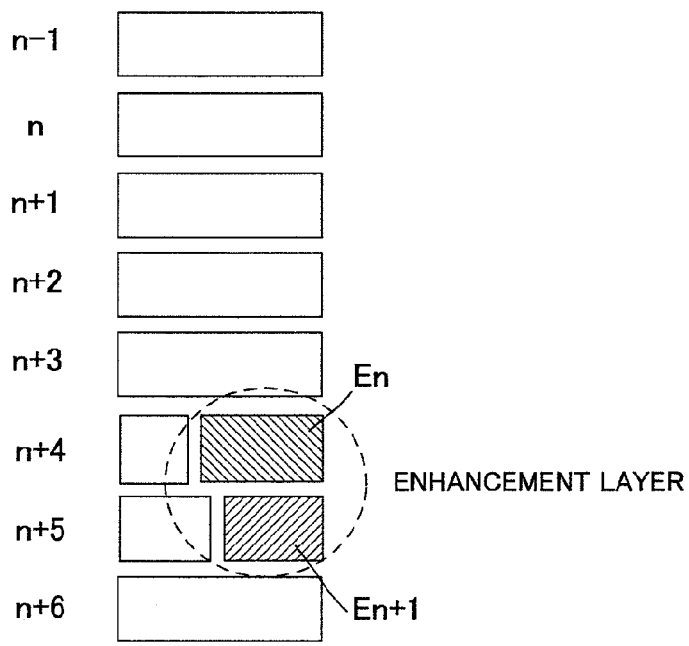
FIG. 14 is a view showing an example of the transmission order of coded data of an enhancement layer.

In the second embodiment of the present invention, description has been given for the example where deterioration of image quality of a decoded image is reduced by a buffer size of a decoding apparatus. A determination criteria for discarding coded data E in this case is a buffer size of the decoding apparatus, but in addition thereto, with an initial delay or load of a receiving terminal as a criteria, it is also possible to discard coded data E. For example, in the case of the following transmission of the enhancement layer shown in FIG. 7, since the coded data is transmitted in the order shown in FIG. 14, in order to display the image n, it is necessary to wait four pieces later after En is received and stored in the buffer 801. When it is desired to reduce the delay immediately after an application is activated, by decoding only coded data B even if image quality is somewhat poor for a certain period of time, the initial delay is able to be reduced. At this time, based on the delay estimation amount added to the head of the coded data, it is able to be determined whether to discard the coded data E.

Further, it is also possible to determine whether to discard coded data E depending on the load of the receiving terminal. For example, on the receiving terminal, it is general that plural applications run at the same time. In the case where it is possible to change allocation of the memory dynamically for each of the applications, memory resources are sufficient when the number of running applications is small, and therefore, a decoding apparatus is able to allocate a large capacity of memory exceeding the application specification as the buffer 801 and a large amount of coded data E is able to be stored. However, as the number of running applications increases, the memory which can be allocated to the decoding apparatus decreases, and therefore, only the code amount defined by the specification can be stored. Accordingly, by the number of applications running on the receiving terminal and the amount of memory resources allocated to the decoding apparatus, it is also possible to change the discarding criteria of coded data E.

Modified Example 2

The modified example 1 in which some determination criteria are applied has exemplified the embodiment where coded data E is discarded. In the modified example 2, description will be given for a method for selecting coded data E to be discarded.

In the case of a buffer shown in FIG. 11, it is possible to discard from coded data E with an older decoding time. In addition, when there are three or more of hierarchies, that is, the enhancement layer has two or more hierarchies, it is possible to select the enhancement layer to be discarded by the type of hierarchical coding of the enhancement layer or the priority order described in the first embodiment of the present invention.

For example, discarding is carried out from coded data E belonging to the type of hierarchical coding that is not important in the receiving terminal. When a display screen of the receiving terminal has a QCIF size, the spatial scalability for realizing QVGA and CIF is not necessary. Accordingly, the enhancement layer having the spatial scalability is discarded.

In addition, discarding may be carried out from the enhancement layer whose priority order added by the coding apparatus is low. When the enhancement layer has two hierarchies and the priority orders of 1 and 2, respectively (the priority order of 1 is higher), discarding is carried out from the enhancement layer with the priority order of 2.

In addition, when the coding apparatus adds discarding information of coded data E, if the buffer in the decoding apparatus is insufficient, and coded data E of an image to which the coding apparatus instructs discarding remains in the buffer, the coded data E is able to be discarded. For example, when it is specified to discard the enhancement layer of the image n, coded data E corresponding to the enhancement layer of the image n is deleted by searching the management table.

Alternatively, when all of enhancement layers that have been transmitted so far are discarded, all records of the enhancement layers recorded in the management table are deleted and the read-out address and the write-in address of the enhancement layers are returned to an initial value, thus enabling to discard data.

In this manner, when the buffer of the decoding apparatus is insufficient, by discarding coded data E using the determination criteria for discarding coded data E of the decoding apparatus or added information from the encoding apparatus, discarding of coded data E, which is best for the receiving terminal, is able to be carried out and it is also possible to enhance image quality by the capability of the decoding apparatus.

Note that, a discarding unit of coded data E depends on a coding method of the coding apparatus, and when coded data E is not used for prediction of subsequent images, discarding in the unit of an image is possible, while when using for the prediction, discarding is carried out in the unit of GOP (Group Of Picture) or GOV (Group Of Video object plane).

Modified Example 3

Figure 15:
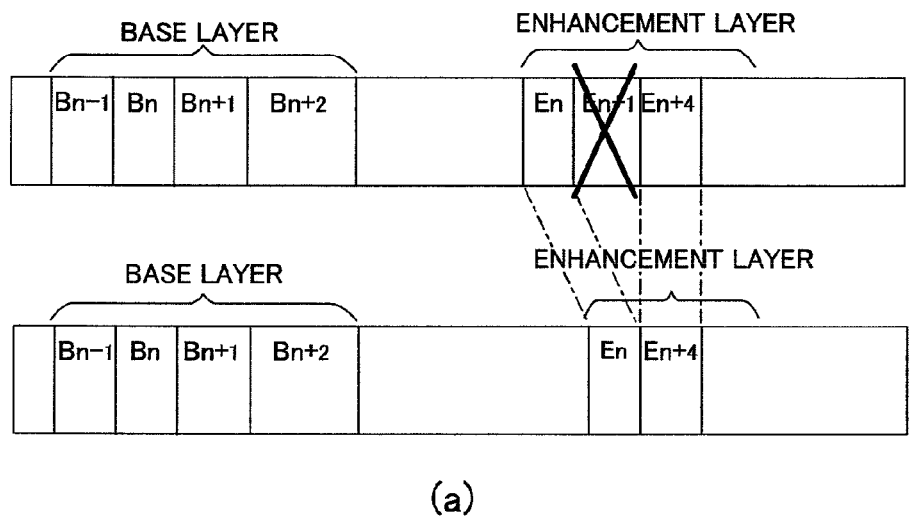
FIG. 15 is a view describing discarding of coded data of an enhancement layer and updating of a management table.
Figure 19:
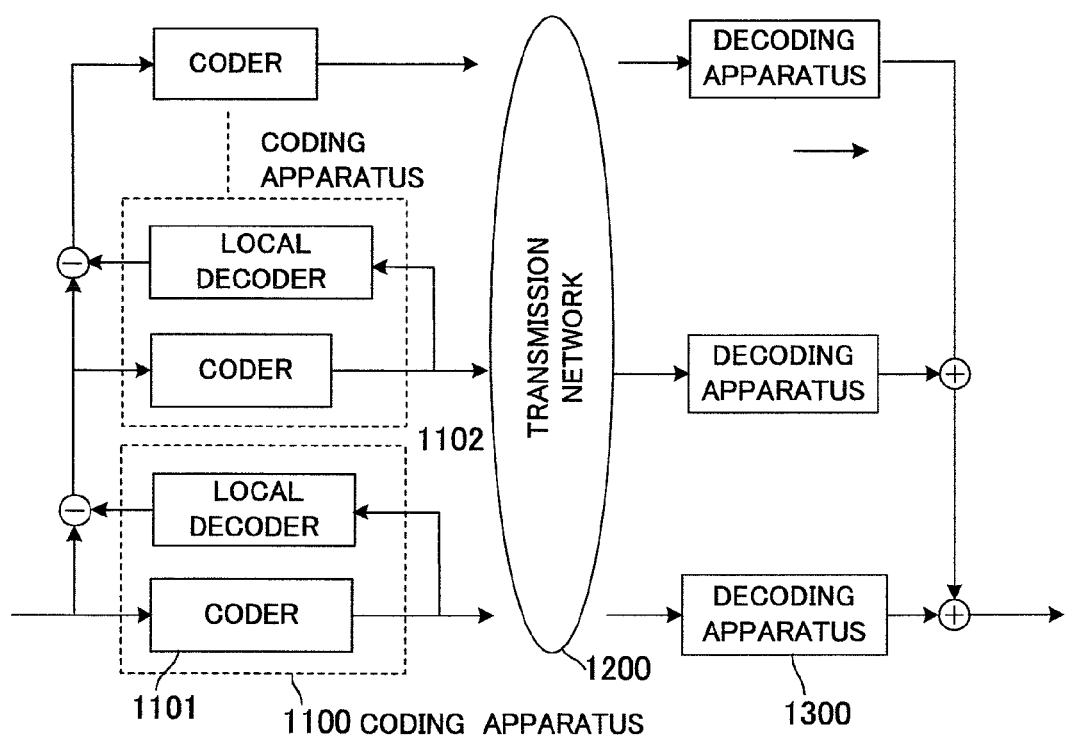
FIG. 19 is a block diagram of a conventional hierarchical coding apparatus.

Next, description will be given for a management table when discarding coded data E and data in the buffer 801. The buffer 801 is realized by a FIFO described above in one case and is realized by a RAM in another case. Since random access is possible in the case of the RAM, an address and added information may be written in the management table by allocating an area where data is discarded to coded data newly received. In the case of the FIFO, it is necessary to process in such a way that an area where discarded data has been allocated is filled with coded data E that exists before it and is not discarded, and that coded data is able to be read out continuously. Further, it is necessary to update the management table accordingly. A management table in which En+1 is discarded for updating in the management table of FIG. 10 is shown in FIG. 15(b). As shown in FIG. 15(a), in the buffer 801, En+1 is discarded and En that exists before it is closed up and recorded, thus securing an area for writing coded data Bn+3. The address of En is updated in the management table accordingly.

As above, in the case of the FIFO, when in an area corresponding to discarded data, coded data E that exists before it is closed up, it is possible to access a memory continuously in decoding processing.

Note that, although description has been given in the above for the example where the buffer and the management table are managed separately, for example, when the buffer is realized by the RAM, it is also possible to manage all information with only one buffer by recording management information in the head of coded data as shown in FIG. 16.

Note that, the present invention will not be limited to above described embodiments and many modifications and alterations can certainly be made within the scope of the present invention.

What is claimed is:

1. A moving image decoding apparatus, comprising:
an information reading means for reading information added to coded data;
a decoding buffer for storing target amount coded data in which a moving image is coded within a target code amount set in advance, excess coded data in which a part exceeding the target code amount is coded, and the added information to be read;
a target amount decoding portion for decoding the target amount coded data;

at least one excess decoding portion for decoding the excess coded data; and a synthesizing portion for synthesizing decoded images decoded by the target amount decoding portion and the excess decoding portion and outputting the synthesized image, and wherein, as a discarding determination criteria of the excess coded data, the added information includes at least any of:

a delay estimation value that indicates a delay of the excess coded data with respect to the target amount coded data;

a buffer size of the decoding buffer;

load of the moving image decoding apparatus; and resolution of a display screen of a receiving terminal, and wherein the excess coded data is discarded from the decoding buffer, based on a situation of the receiving terminal and the discarding determination criteria.

2. The moving image coding apparatus according to claim 1, wherein the added information includes the delay estimation value that indicates a delay of the excess coded data with respect to the target amount coded data, and wherein the excess coded data is discarded from the decoding buffer, based on the delay estimation value in a predetermined time upon activation of an application with regards to the receiving terminal.

3. The moving image coding apparatus according to claim 1, wherein the added information includes the buffer size of the decoding buffer and the load of the moving image coding apparatus, and wherein when the number of applications running on the receiving terminal or an amount of memory resources allocated to the moving image decoding apparatus exceeds the load of the moving image coding apparatus, the load being included in the added information, the excess coded data is discarded from the decoding buffer.

4. The moving image coding apparatus according to claim 1, wherein the added information includes the resolution of a display screen of a receiving terminal, and wherein, when it is determined that display ability of the receiving terminal is lower than said resolution of the display screen of the receiving terminal included in the added information, the excess coded data is discarded from the decoding buffer.

* * * * *